(12) United States Patent
Scruggs

(10) Patent No.: US 9,725,255 B1
(45) Date of Patent: Aug. 8, 2017

(54) VORTEX EFFECT PRODUCTION DEVICE AND METHOD OF IMPROVED TRANSPORT OF MATERIALS THROUGH A TUBE, PIPE, AND/OR CYLINDER STRUCTURE

(71) Applicant: James A. Scruggs, Memphis, TN (US)

(72) Inventor: James A. Scruggs, Memphis, TN (US)

( * ) Notice: Subject to any disclaimer, the term of this patent is extended or adjusted under 35 U.S.C. 154(b) by 0 days.

(21) Appl. No.: 14/283,218

(22) Filed: May 21, 2014

Related U.S. Application Data

(60) Provisional application No. 61/855,655, filed on May 20, 2013.

(51) Int. Cl.
*B65G 53/52* (2006.01)
*B65G 53/28* (2006.01)

(52) U.S. Cl.
CPC .................................. *B65G 53/28* (2013.01)

(58) Field of Classification Search
USPC ............................................ 406/92, 84, 194
See application file for complete search history.

(56) References Cited

U.S. PATENT DOCUMENTS

| | | | | |
|---|---|---|---|---|
| 857,096 A * | 6/1907 | McCord | ............. | B01D 19/0042 406/131 |
| 1,051,905 A * | 2/1913 | McCord | ............. | B01D 19/0042 34/580 |
| 1,243,893 A * | 10/1917 | Strong | ................... | B65G 53/58 285/16 |
| RE24,716 E * | 10/1959 | Anselm et al. | ........... | B22C 5/16 406/92 |
| 3,301,606 A * | 1/1967 | Bruno | ....................... | E02F 3/92 15/409 |
| 4,028,009 A * | 6/1977 | Gudzenko | ................. | E02F 3/90 166/51 |
| 4,097,092 A * | 6/1978 | Lapple | ................... | B65G 53/58 406/194 |
| 4,462,777 A * | 7/1984 | Watanabe | ............... | B22C 15/24 164/20 |
| 5,232,314 A * | 8/1993 | Hopkins | ................ | B65G 53/58 406/153 |
| 5,429,156 A * | 7/1995 | Ueda | ...................... | B65G 53/58 137/888 |
| 6,053,667 A * | 4/2000 | Sakai | ..................... | B65G 51/02 406/56 |
| 6,200,071 B1 * | 3/2001 | Karasawa | ............ | B65G 53/521 406/193 |

(Continued)

*Primary Examiner* — Joseph Dillon, Jr.
(74) *Attorney, Agent, or Firm* — William S. Parks

(57) ABSTRACT

A tubular or cylindrical unit that creates a vortex effect with externally supplied pressurized fluid injected angularly within a transport structure is provided. Such a unit is utilized to either accelerate the vacuum and/or air conveyance of liquids, solid aggregates, and gases, reduce the energy required for such materials transport processes, or both. Such a result is achieved through the introduction of pressurized fluid via a plurality of injectors situated evenly around the circumference of the subject tube, pipe, and/or cylinder, and angled uniformly for an even pressure injection of fluid within the conveyance component thereof. In effect, through such injection of pressurized fluid, the overall transport system may be operated at significantly reduced cost while increasing the efficiency of overall vacuum and air conveyance systems simultaneously. The method of utilization of such a device is also encompassed within this invention.

6 Claims, 14 Drawing Sheets

(56) References Cited

U.S. PATENT DOCUMENTS

| | | | |
|---|---|---|---|
| 6,840,715 B2 * | 1/2005 | Crovara Pescia | B65G 51/01 406/198 |
| 6,974,279 B2 * | 12/2005 | Morohashi | B65G 53/58 406/173 |
| 9,162,830 B2 * | 10/2015 | Phillips | B65G 53/16 |
| 2005/0074303 A1 * | 4/2005 | Morohashi | B65G 53/58 406/194 |

* cited by examiner

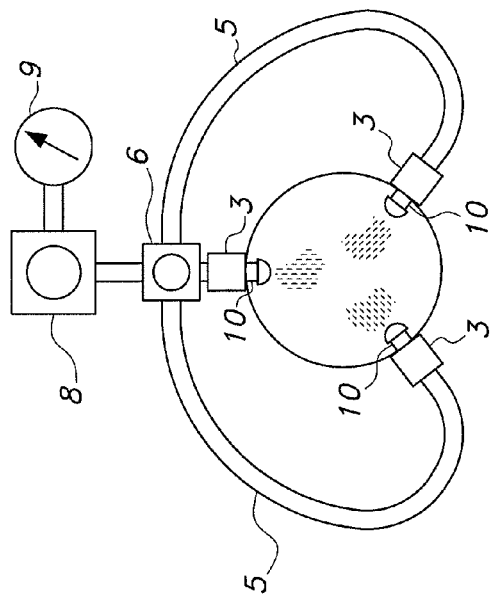
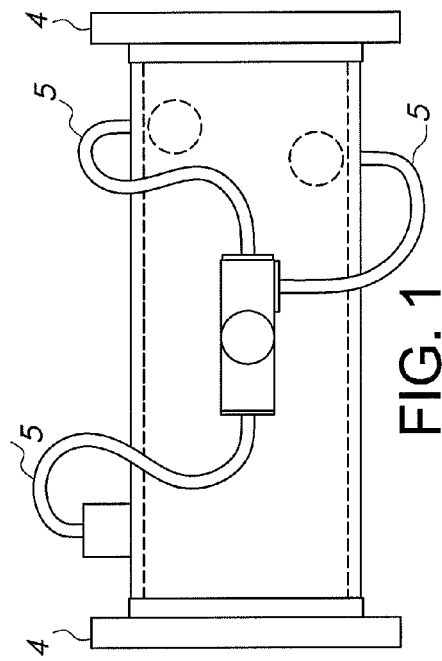
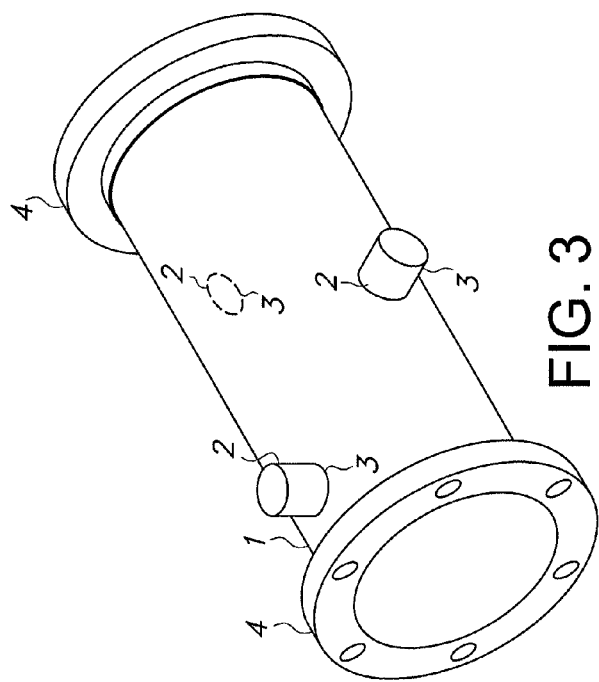
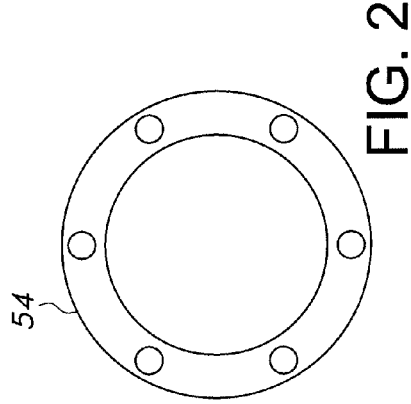

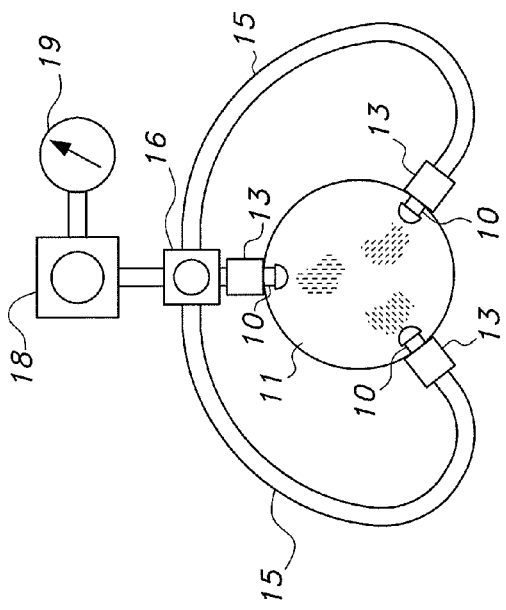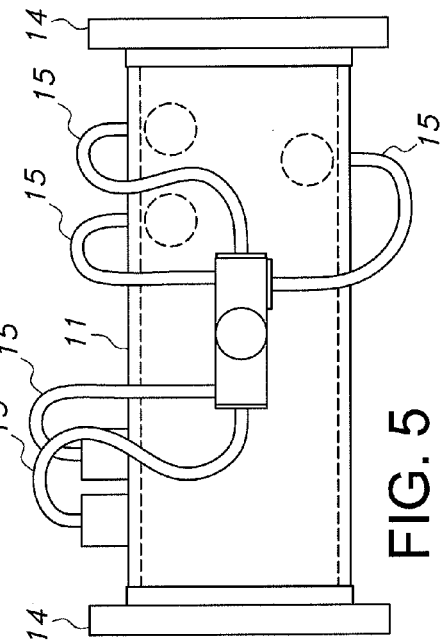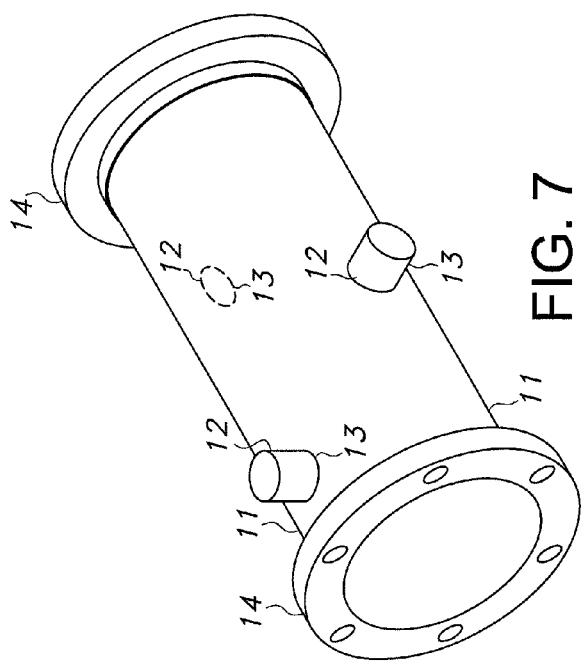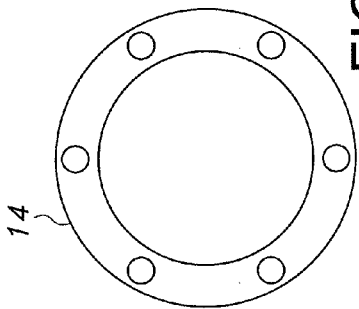

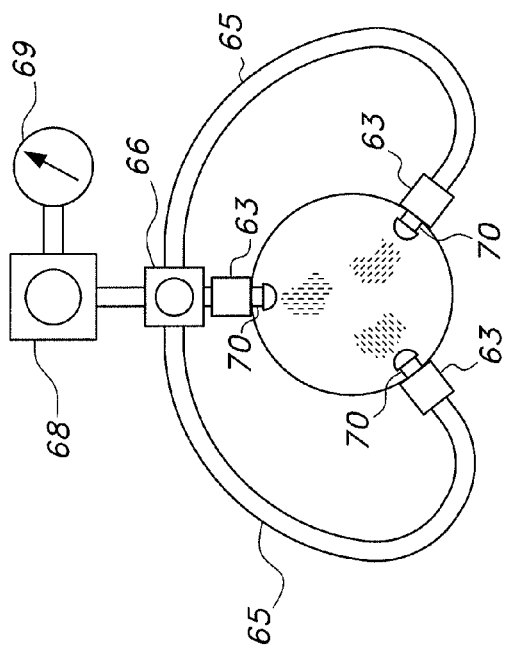
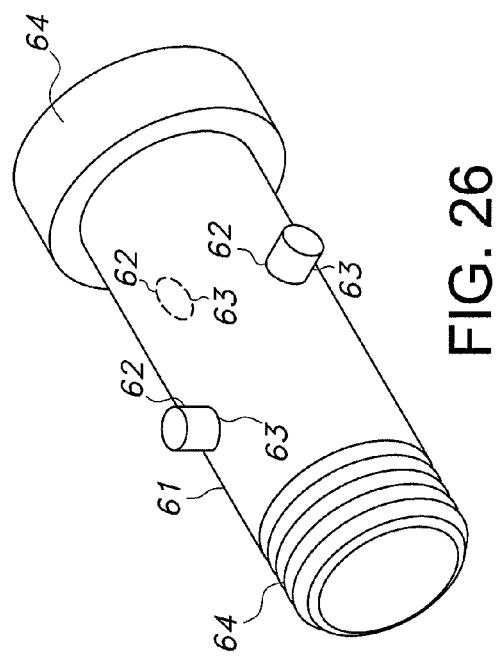
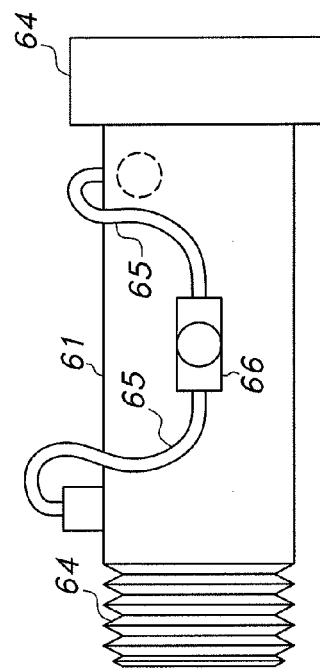
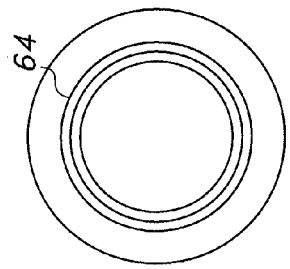

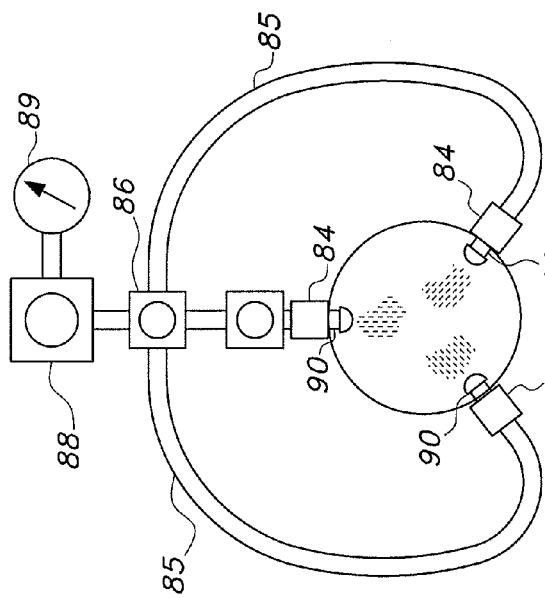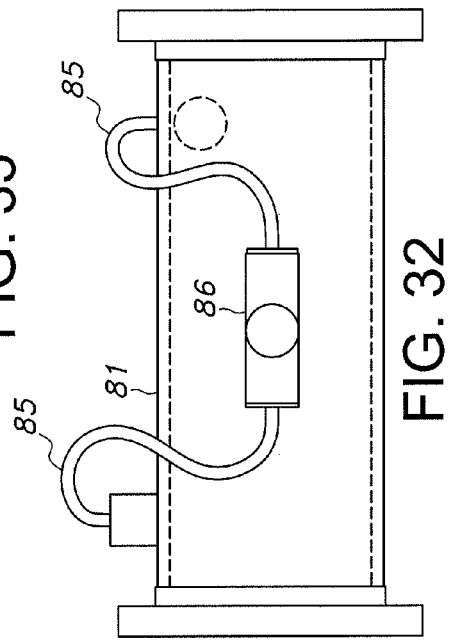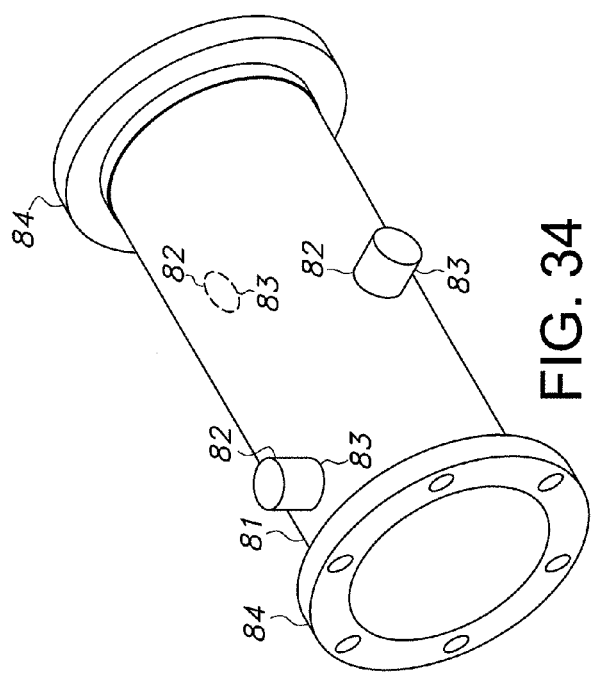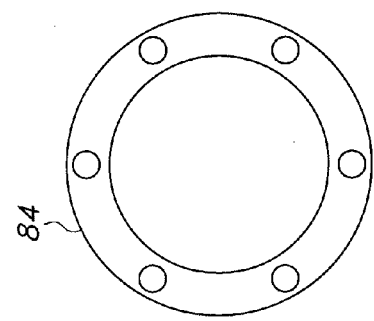
FIG. 35
FIG. 32
FIG. 34
FIG. 33

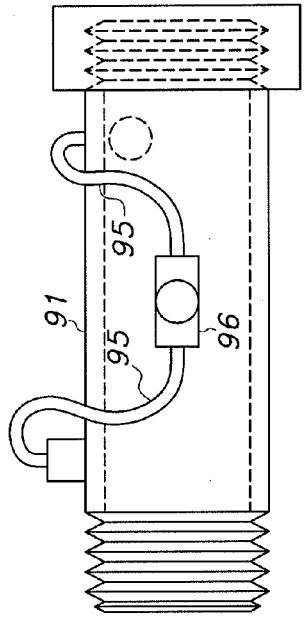
FIG. 36
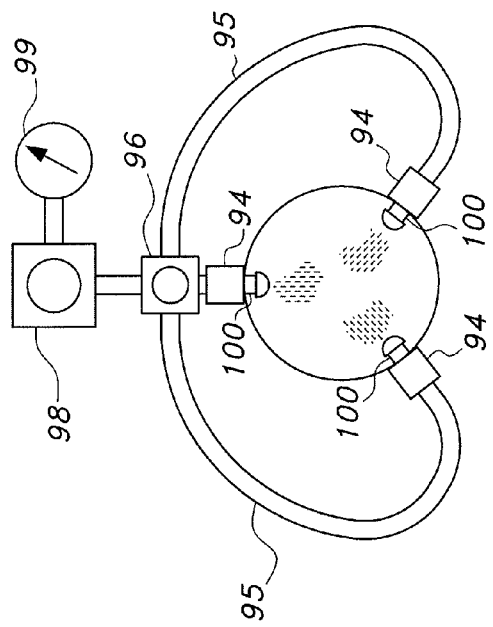
FIG. 38
FIG. 37
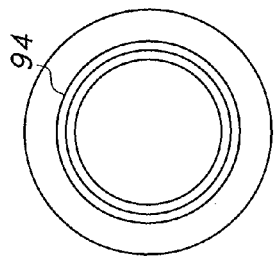
FIG. 39

VORTEX EFFECT PRODUCTION DEVICE AND METHOD OF IMPROVED TRANSPORT OF MATERIALS THROUGH A TUBE, PIPE, AND/OR CYLINDER STRUCTURE

FIELD OF THE INVENTION

A tubular or cylindrical unit that creates a vortex effect with externally supplied pressurized fluid injected angularly within a transport structure is provided. Such a unit is utilized to either accelerate the vacuum and/or air conveyance of liquids, solid aggregates, and gases, reduce the energy required for such materials transport processes, or both. Such a result is achieved through the introduction of pressurized fluid via a plurality of injectors situated evenly around the circumference of the subject tube, pipe, and/or cylinder, and angled uniformly for an even pressure injection of fluid within the conveyance component thereof. In effect, through such injection of pressurized fluid, the overall transport system may be operated at significantly reduced cost while increasing the efficiency of overall vacuum and air conveyance systems simultaneously. The method of utilization of such a device is also encompassed within this invention.

BACKGROUND OF THE INVENTION

Transport of materials, whether liquids, solids, and even gases, has been of enormous importance for a myriad of reasons. Whether necessary for removal purposes, introduction within and at certain locations, or other similar situations that utilize a horizontal operation, such activities have proven valuable for various economic bases. Typically, such material movement through vertical and/or horizontal pipes and tubes requires a significant amount of energy from vacuum and air conveyance systems due to gravity effects, laminar flow limitations, and conveyance speed requirements, at least. In terms of vacuum systems, air conveyance can only transport materials a certain distance and at a certain maximum loading speed, dependent on a number of factors, such as material weight, material density, and pipe or tube diameter.

Dynamic pressure through such devices are measurable, at least in terms of fluid dynamics, by the equation:

$$q = \frac{1}{2} p \ast v 2$$

wherein q is dynamic pressure measured in Pascals, p is fluid density, and v is velocity through the device. Such dynamic pressure is equal to the difference between stagnation pressure and static pressure. There is thus a need to provide an effective change in such dynamic pressure measurements within a vacuum column (or air conveyance system) in order to provide greater efficiencies. To that end, as is stated in the conservation of energy theorem, energy is constant and neither created nor destroyed, just changed in terms of form. Thus, for instance, energy from air (or other introduced gas) exhibits a pressure stream that angularly strikes the pipe/tube/cylinder wall and modifies the dynamic pressure of the vacuum column during operation. Such changes effectively evince reductions in energy to move materials in such devices as a result. The problem, however, remains that the energy required for such vacuum pressure applications is significant for any such effect.

There thus exists a need to provide improvements in materials transport through such pipe/tube systems, particularly in terms of reducing the energy necessary to undertake such a task without appreciably decreasing materials transport rates (or transversely, increasing such rates with similar energy output measurements). To date, such has not been effectively provided within the pertinent industries.

For instance, vacuum devices are standard to allow for such transport from a certain desired location. Although such devices may provide a relatively effective means for conveyance in these situations, the energy required for operation, particularly if the materials are of, again, significant weight and/or density, and if the pipe/tube is of a limited diameter, can be extremely high. A means to permit more effective movement through the selected tube/pipe in conjunction with a vacuum system would be highly prized, specifically with the reduced need for vacuum strength for the overall desired effect. Thus, for instance, vacuum systems for the removal of waste from various locations (such as street sweepers, septic tank cleaners, and the like), as well as solid particulate transporters (such as for, for instance, fertilizer, salt, silicon dioxide, and the like, movement devices) for manufacturing or other like operations, and even within mechanical valve-like devices (such as synthetic heart valves, for instance), all suffer from the same associated limitations. Although some transport to and through such devices may be accomplished to a certain degree, their effectiveness has proven compromised when coupled to the necessary energy generation needed for operation and/or the valves themselves lack the needed effective transport result at the rate and in the same manner as is necessary for proper actions within the selected milieu.

Likewise, in situations where air conveyance (or other type of forwardly forced material movement) is undertaken, the energy levels needed can be excessive for effective results. Additionally, the forced air operation may face significant difficulties in terms of laminar flow through the selected pipe/tube due to turbulence and density of the materials themselves. Continued forced air may result, for instance, in uneven packing of solids and inner surface adhesion for liquids (as well as potential turbulence with gases). This uneven action may also result in uneven blending of materials during transport in certain circumstances that may prove deleterious for the overall operation, as well.

In any event, there exists a great need to provide improved materials transport potential with increased efficiency of vacuum and air conveyance systems in terms of both/either energy levels needed for effective transport and/or faster transport times with lower energy levels required. Additionally, a device and/or method that allows for more effective blending of transported materials in such a situation would also be desirable in some situations. To date, however, such a system or systems has yet to be provided the pertinent industries that meet such improved energy output levels, at least.

ADVANTAGES AND SUMMARY OF THE INVENTION

Thus, one significant advantage of the present invention is the ability to reduce dynamic pressures within a conveyance tube/pipe with energy levels far lower than for typical air or vacuum conveyance applications. Another advantage is the ability to utilize such a structure within any type of material conveyance application utilization a tube/pipe/cylinder device. Yet another advantage of the inventive system is the ability to reduce ineffective and deleterious turbulence within the subject pipe/tube/cylinder thereby allowing not only faster materials transport but also more effective blending of introduced materials therein during transport.

Accordingly, the invention encompasses a materials transport device including a cylinder, pipe, and/or tube conveyance component having an external portion and an internal portion, wherein said conveyance component includes at least two (preferably three or more) injectors providing internal introduction of forced fluids angularly within the internal portion portion of said conveyance component, wherein said injectors are aligned to provide similar angles of fluid introduction within said conveyance component internal portion, and wherein said injectors are housed on the external portion of said conveyance component. Also encompassed within this invention is the materials transport device as noted above and including fluid source component that is connected separately to each injector, thereby introducing the same pressure and velocity fluid within the conveyance component internal portion during operation. Further encompassed within this invention is a method of providing materials transport utilizing the transport device as described above. As well, the transport device provided in the form of a solids transport, a liquid transport, a gas transport, and in the form of a valve-like structure, vacuum-assisted structure, and/or air or liquid conveyance structure, is also encompassed herein.

In essence, the overall inventive transport device is one that allows for more efficient materials transport through the utilization of the plurality of injectors introducing similar and simultaneously introduced fluids within the internal portion of the conveyance component thereof. In this manner, the term fluids is intended to include, without limitation, a liquid, a gas, or mixtures and/or combinations of multiple liquids, multiple gases, or both gases and liquids. Such a result is achieved through the introduction of pressurized fluid via a plurality of injectors situated evenly around the circumference of the subject tube, pipe, and/or cylinder, and angled uniformly (at any angle that aims into the internal portion of the conveyance component of the device; a range of from 1 to 75°, with from 5 to 45° more preferred, and from about 10 to 30° potentially most preferred) for an even pressure injection of fluid within the conveyance component thereof. The injection of such fluids at specified angles and at selected pressures and/or velocities allows for the internal generation of a vortex effect within the conveyance component which, in turn, increases the speed of materials transport, reduces turbulence (and thus dynamic pressures) within the device, and, overall, allows for energy reductions in terms of assisting air or liquid conveyance or vacuum device utilization for such transport purposes through the overall device. Whether horizontally or vertically aligned, and whether such a line includes both horizontal and vertical configurations to allow transport from one location to another, the inclusion of such a plurality of injectors for such a purpose has proven effective for such improved transport results.

In effect, the inventive materials transport device includes the conveyance component that changes the dynamic pressure of the vacuum column therein through the creation of a vortex effect caused when the introduced pressurized air angularly strikes the tubular cylinder wall. Such a result effectively modifies the atmospheric pressure inside the tubular cylinder, thus allowing the vortex effect to modify the internal differential pressure.

The versatile nature of such a configuration is shown as typical vacuum systems, fuel injector systems (for automated vehicles, for instance), air conveyance devices, and even synthetic heart valves (that provide a vortex effect that is the normal action of natural heart valve structures; typical mechanical valves do not accord such prized and "natural" effects, thus leading to the inventive valve devices discussed herein according far better results for typical human circulatory/vascular system actions). Additionally, in terms of for instance, fuel injector systems, the ability to utilize overflow fuel as the base injected fluid not only improves overall effectiveness and efficiency of the overall device from a energy level standpoint, but also in terms of reduction of "waste" fuel as the potential exists for far more fuel to be actually utilized within the overall activity than for typical, standard fuel injections systems utilized today. As such, as noted above, this multiple injector vortex production effect thus permits a relatively simple add-on to standard materials transport systems (such as the removal of a tubing component and replacement with one including the multi-injector structure included) to permit production of such an effective energy reduction result.

In other respects, the system may include the addition or inclusion of a blower, vein, or vacuum system attached to a base vacuum accelerator, as well. Such an overall configuration utilizing the inventive device requires less energy to perform the same amount of work of materials transport as without. In such situations, then, significant savings can also be realized by utilizing smaller engines and motors to perform standard vacuum activities without losing any effectiveness. The ability to reduce the overall engine size to this degree may result in the consumption of less fuel and energy since the engine can run at full effectiveness but at fewer revolutions per minute, thereby also saving component life on the systems as well. Furthermore, the utilization of a vacuum accelerator with the inventive device can allow for the application of a negative pressure vacuum system thereto, permitting multiple reductions in energy since the base vacuum does not require increased energy levels for full capacity in performance.

Additionally, the application of such a vacuum accelerator to a centrifugal or centrifical compressor (or any air conveyance system, for that matter), the vacuum accelerator can function in a similar manner, albeit at a different work ratio. In such air conveyance systems, in other words, the added vacuum accelerator aids in reducing frictional drag within the transport device and consequently aids to reduce the natural force of gravity on the conveyed material, as well. This capability then permits an overall reduction in the amount of energy required to move such conveyed materials through any applied transport pipe or cylinder. In one example, then, a vacuum accelerator may be placed in line with an air conveyance column; the resultant vacuum accelerator helps the air conveyance system move material faster and with less energy than an air conveyance system without a vacuum accelerator, ostensibly modifying the system into an air conveyance accelerator.

Another application of the inventive device may be the utilization of such a vacuum accelerators within industrial plants in order to move liquids and solids in plant lines at reduced energy costs and at higher velocities. As it applies to horizontal, vertical, or even diagonal transport lines, such a device helps achieve greater efficiencies as noted above.

Furthermore, such a device may be utilized to alter or mix substances for industrial and food service applications. As above, such is achieved through the introduction of the pressurized fluid via the plurality of injectors situated evenly around the circumference of the subject tube, pipe, and/or cylinder, and angled uniformly for an even pressure injection of fluid within the conveyance component thereof. Added to such a device, then, is the ability, for instance, to create an effective and thorough mixing result during transport of materials through the generation of such a vortex effect. Coupled to such a potential operation could be variations in temperatures (external to internal, for instance); if such temperatures are varied in such a respect, the transport device could effective heat or cool the transported materials, permitting not only thorough mixing, but possible modifications in the substances themselves. Again, this permits not only a reduction in energy for transport purposes, but the potential for reduced energy requirements for mixing as well, thereby increasing the overall effectiveness and efficiency of the entire system.

In one non-limiting example, with ice cream raw materials passed through the inventive device, the mixing and efficiency of moving and condensing the end product consistency could be greatly improved. With the natural formation of an electro-magnetic field when kinetic energy is transformed into dynamic pressure, there further exists the potential for improved blending of such substances passing through the vortex effect at a molecular level, too. Such a result could occur at a particle basis after passing through the produced vortex since it could also be (theoretically) superheated or super cooled through temperature controls.

Such blending benefits could thus also aid in the medical and chemical fields, respectively, particularly to blend substances into compounds. Another application in the medical field would be in the blending of medicines for the human body, particularly as this device permits such mixing, again, while being transported, rather than prior to or after such a blending step.

One particularly effective application for the inventive device is medically based in terms of synthetic valves for the human heart. Blood flow into and from the human heart is accomplished through certain valves that are known to create a natural vortex effect that spins off negative charges. Artificial heart replacement valves do not provide similar effects, thus limiting the effectiveness of such synthetic structures. For instance, if such an artificial valve could spin off negative charges in the left ventricle, optimal blood transport results could be realized. Unfortunately, such is not the case, and the standard artificial valves create far reduced levels of blood flow within the patient's body. The present invention can be properly sized and configured to utilize blood as the injected fluid and could be utilized as a more efficient artificial human heart replacement valve that more closely simulates the actual human circulatory system. In comparison with standard artificial heart valves, the inventive device could also reduce clotting and other undesirable factors, as well.

In terms of production particulars, as examples, a vacuum accelerator materials transport device of the present invention may be constructed of a variety of materials such as steel, abrasion resistant steel, extend steel, corten steel, polyvinyl chloride, plastic resin, glass, all forms of stainless or precious metals, aluminum, alloys, copper, bronze, and the like (including any combinations thereof). For production purposes, a manufacturer would typically start with a tube or cylindrical shaped structure and add flanges thereto. These flanges are normally constructed of the same material as the tube. Flanges can be either band lock, flat flange, seamless, bolt able, and or weld able or clamp together flanges of any nature. The flanges allow for attachment to other tubes/pipes/cylinders at either end to permit reliable introduction of the conveyance component of the overall materials transport device. Once securely in place, the overall device may be utilized with the injectors connected to and introducing a fluid source at the necessary angles within the internal portion of the conveyance component to achieve the desired vortex effect and thus the overall improvements in materials transport efficiencies.

BRIEF DESCRIPTION OF THE DRAWINGS

FIG. 1 provides a top view of a large diameter (60") pipe conveyance component of the present invention.

FIG. 2 shows a front view of the same pipe of FIG. 1.

FIG. 3 shows a top perspective view of the same pipe of FIG. 1.

FIG. 4 shows a front cross-sectional view of the conveyance component pipe of FIG. 1.

FIG. 5 provides a top view of a small diameter (18") pipe conveyance component of the present invention.

FIG. 6 shows a front view of the same pipe of FIG. 5.

FIG. 7 shows a top perspective view of the same pipe of FIG. 5.

FIG. 8 shows a front cross-sectional view of the conveyance component pipe of FIG. 5.

FIG. 24 provides a top view of a high pressure water system vacuum accelerator-type pipe conveyance component of the present invention.

FIG. 25 shows a front view of the same pipe of FIG. 24.

FIG. 26 shows a top perspective view of the same pipe of FIG. 24.

FIG. 27 shows a front cross-sectional view of the conveyance component pipe of FIG. 24.

FIG. 32 provides a top view of an air-style industrial vacuum accelerator pipe conveyance component of the present invention.

FIG. 33 shows a front view of the same pipe of FIG. 32.

FIG. 34 shows a top perspective view of the same pipe of FIG. 32.

FIG. 35 shows a front cross-sectional view of the conveyance component pipe of FIG. 32.

FIG. 36 provides a top view of a water transmission vacuum accelerator long distance transport pipe conveyance component of the present invention.

FIG. 37 shows a front view of the same pipe of FIG. 36.

FIG. 38 shows a top perspective view of the same pipe of FIG. 36.

FIG. 39 shows a front cross-sectional view of the conveyance component pipe of FIG. 36.

DETAILED DESCRIPTION OF THE DRAWINGS AND PREFERRED EMBODIMENTS OF THE INVENTION

Without any intention of limiting the breadth and scope of the overall inventive method, the following descriptions of the accompanying drawings provide a number of potentially preferred embodiments of the inventive overall transport improvement device.

Figure 52:
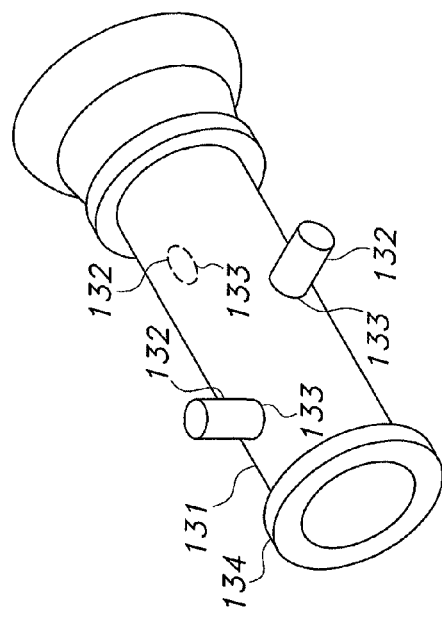
FIG. 52 is a top perspective view of the same pipe of FIG. 48.
Figure 49:
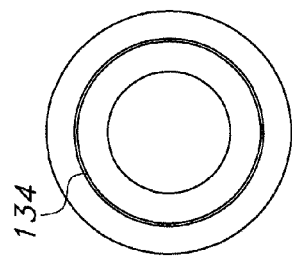
FIG. 49 shows a front view of the same pipe of FIG. 48.
Figure 50:
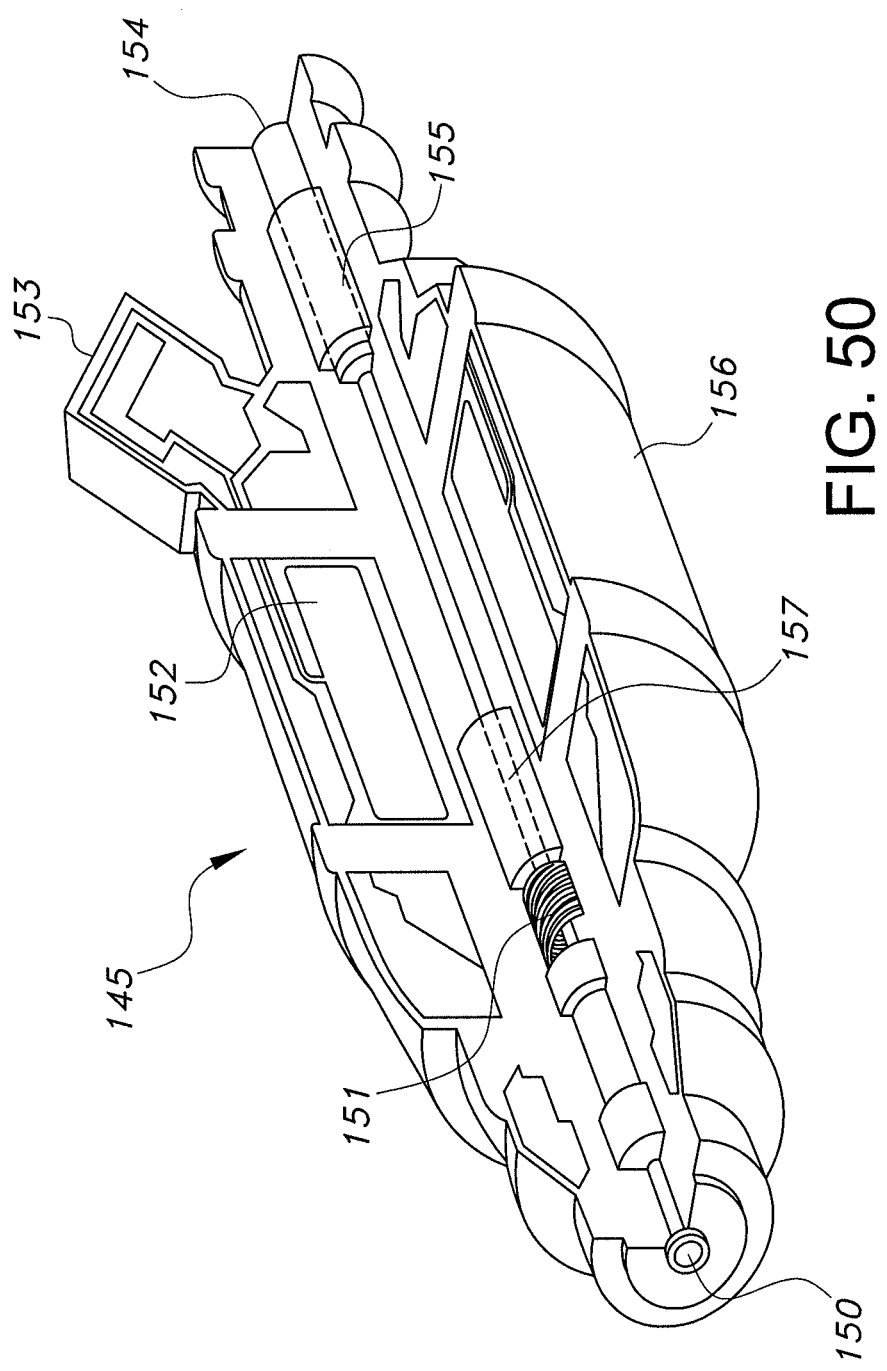
FIG. 50 shows a partial cut-away front perspective view of a fuel injector to which the inventive conveyance component of FIG. 48 is added.

The accompanying FIGS. 1-52) provided herein all pertain to different versions of conveyance components that may be utilized in conjunction with the broadly defined inventive materials transport device. As noted above and herein, the basic structure is a pipe, tube, or cylinder to which a plurality of injectors have been incorporated within the conveyance component from an external source and introduced for injection within the internal portion at uniform angles and evenly spaced around the circumference of the base tube, pipe, and/or cylinder. As well, the injectors are preferably connected simultaneously to the same fluid source in order to introduce the same fluid at the same pressure in order to generate the desired vortex effect within the conveyance component of the materials transport device. In order to achieve such results, the structures may be produced in the following manner, dependent, certainly, upon specific sizes of base structures as it concerns the end-use desired. Thus, for manufacturing purposes, one manner of achieving such conveyance components of the present invention would be within the following steps:

1. A cylindrical tube is provided made of metal or alloy made of sufficient diameter to connect to existing vacuum column with ports drilled in tube.
2. Weld a coupling to tube.
3. Calibrate and attach air couplings to the cylindrical tube.
4. Attach any necessary flanges to the cylindrical tube.
5. Attach air lines to fittings.
6. Install an air manifold.
7. Install a variable air valve (whether mechanical, pneumatic, electrical, electronic or hydraulically actuated, depending on the application).
8. Connect an air supply to the manifold unit.
9. Connect a pressure gauge to the air supply.
10. Insert nozzles into the couplers.

Taking these base steps in conjunction with FIGS. 1-4, for instance, provided is a 60 inch diameter tubular cylinder 1 that is drilled for ports couplings 2 and are welded strategically to the outside cylinder wall. The orifice size of the port with or without nozzles can be varied as well as the angle of the port to increase or decrease the speed and efficiency of the vacuum accelerator 3. The air couplings are attached to the ports on the tubular cylinder 2. Flanges 4 are attached to the end of the tube 1 in various configurations, so that the vacuum accelerator can be attached to the vacuum or air conveyance columns. Air lines 5 are then attached to fittings, the air manifold 6 (4-way valve) to distribute air where needed and a separate airline for air inlet. The variable air valve 7 is then in place to control flow and pressure and is connected to the air supply 8. The pressure gauge 9 is then attached to monitor the overall unit. The nozzles 10 are then inserted within the couplers 2 to permit the injection of the gas (fluid) within the internal portion of the conveyance component of the unit.

Viewing, then FIGS. 5-8, the same basic structure is accorded but with a smaller (18 inch) diameter tubular cylinder 11. Such a cylinder 11 is, as above, drilled for ports couplings 12 and are welded strategically to the outside cylinder wall. The orifice size of the port with or without nozzles can be varied as well as the angle of the port to increase or decrease the speed and efficiency of the vacuum accelerator 13. The air couplings are attached to the ports on the tubular cylinder 12. Flanges 14 are attached to the end of the tube 11 in various configurations, so that the vacuum accelerator can be attached to the vacuum or air conveyance columns. Air lines 15 are then attached to fittings, the air manifold 16 (4-way valve) to distribute air where needed and a separate airline for air inlet. The variable air valve 17 is then in place to control flow and pressure and is connected to the air supply 18. The pressure gauge 19 is then attached to monitor the overall unit. The nozzles 20 are then inserted within the couplers 12 to permit the injection of the gas (fluid) within the internal portion of the conveyance component of the unit.

FIGS. 9-12 pertain to an even smaller (8 inch) diameter tubular cylinder 21 with a band lock flange 24. Such a cylinder 21 is, as above, drilled for ports couplings 22 and are welded strategically to the outside cylinder wall. The orifice size of the port with or without nozzles can be varied as well as the angle of the port to increase or decrease the speed and efficiency of the vacuum accelerator 23. The air couplings are attached to the ports on the tubular cylinder 21. The band lock flanges 24 are attached to the end of the tube 21 in various configurations, so that the vacuum accelerator can be attached to the vacuum or air conveyance columns. Air lines 25 are then attached to fittings, the air manifold 26 (4-way valve) to distribute air where needed and a separate airline for air inlet. The variable air valve 27 is then in place to control flow and pressure and is connected to the air supply 28. The pressure gauge 29 is then attached to monitor the overall unit. The nozzles 30 are then inserted within the couplers 22 to permit the injection of the gas (fluid) within the internal portion of the conveyance component of the unit.

An inventive vacuum/air decelerator configuration is shown in FIGS. 13-16 with a tubular cylinder 31. Such a cylinder 31 is, as above, drilled for ports couplings 32 and are welded strategically to the outside cylinder wall. The orifice size of the port with or without nozzles can be varied as well as the angle of the port to increase or decrease the speed and efficiency of the vacuum accelerator 33. The air couplings are attached to the ports on the tubular cylinder 32. Flanges 34 are attached to the end of the tube 31 in various configurations, so that the vacuum accelerator can be attached to the vacuum or air conveyance columns. Air lines 35 are then attached to fittings, the air manifold 36 (4-way valve) to distribute air where needed and a separate airline for air inlet. The variable air valve 37 is then in place to control flow and pressure and is connected to the air supply 38. The pressure gauge 39 is then attached to monitor the overall unit. The nozzles 40 are then inserted within the couplers 32 to permit the injection of the gas (fluid) within the internal portion of the conveyance component of the unit.

Figure 12:
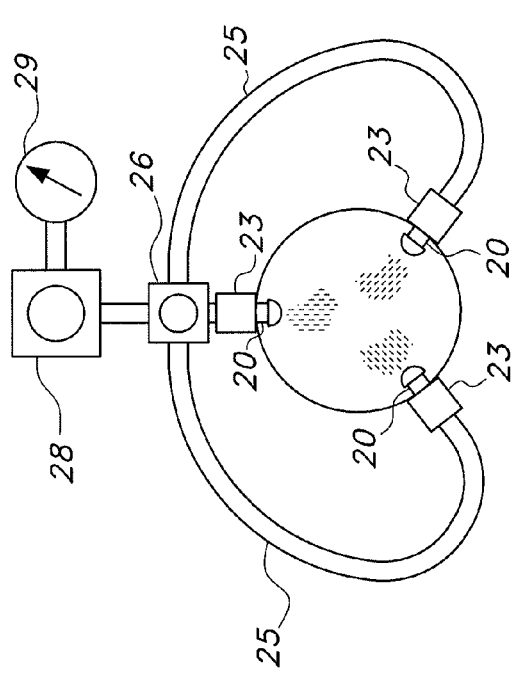
FIG. 12 shows a front cross-sectional view of the conveyance component pipe of FIG. 9.
Figure 9:
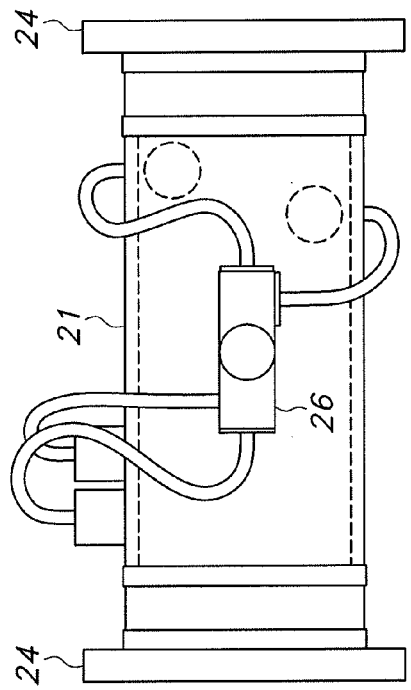
FIG. 9 provides a top view of a band-lock pipe conveyance component of the present invention.
Figure 11:
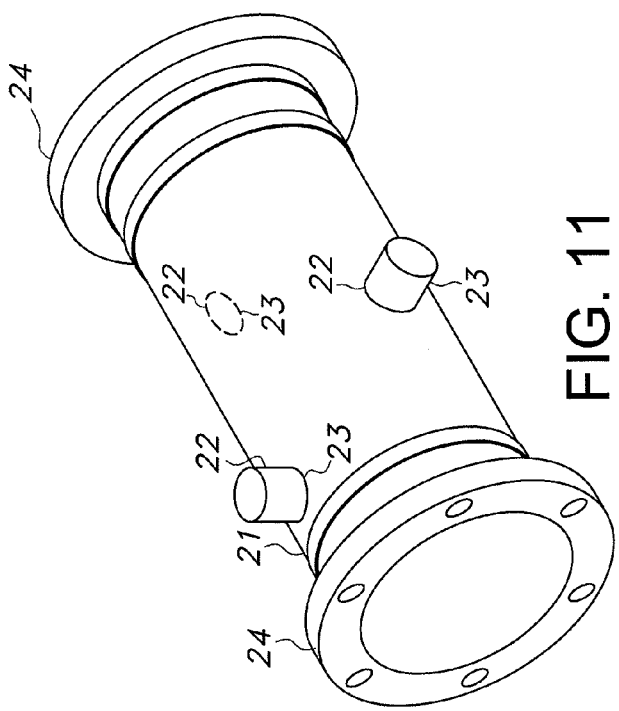
FIG. 11 shows a top perspective view of the same pipe of FIG. 9.
Figure 10:
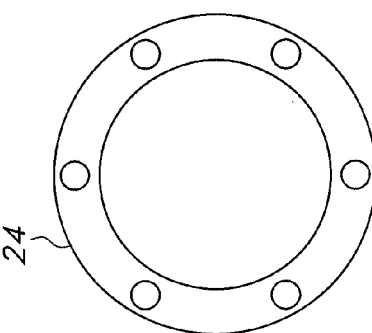
FIG. 10 shows a front view of the same pipe of FIG. 9.
Figure 16:
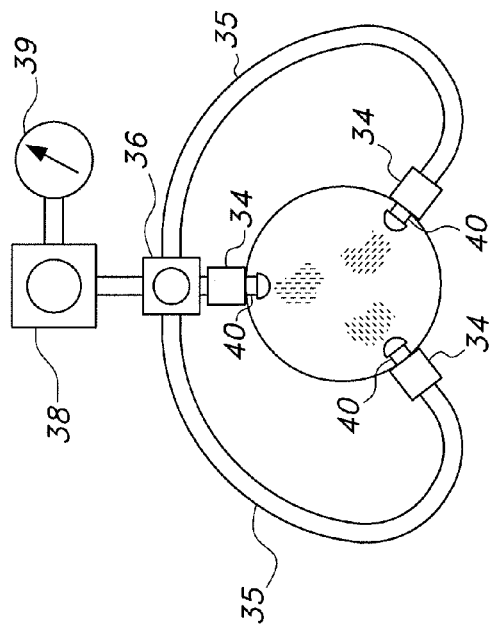
FIG. 16 shows a front cross-sectional view of the conveyance component pipe of FIG. 13.
Figure 13:
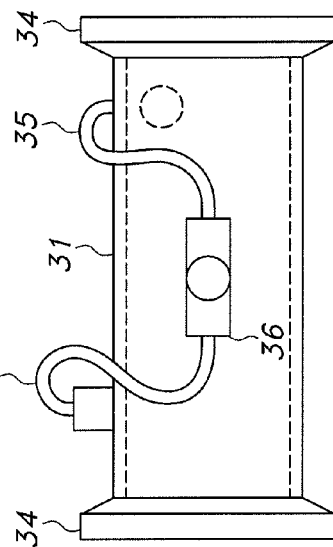
FIG. 13 provides a top view of a vacuum/air decelerator pipe conveyance component of the present invention.
Figure 15:
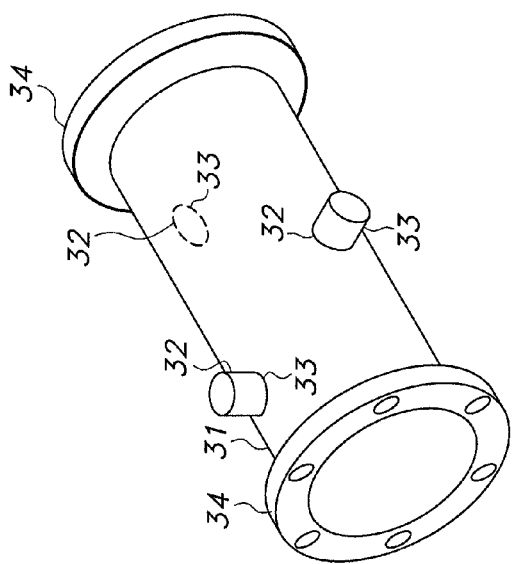
FIG. 15 shows a top perspective view of the same pipe of FIG. 13.
Figure 14:
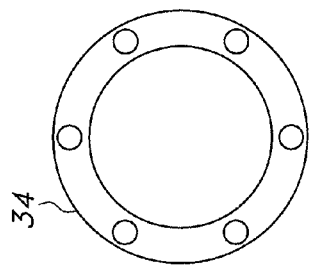
FIG. 14 shows a front view of the same pipe of FIG. 13.
Figure 18:
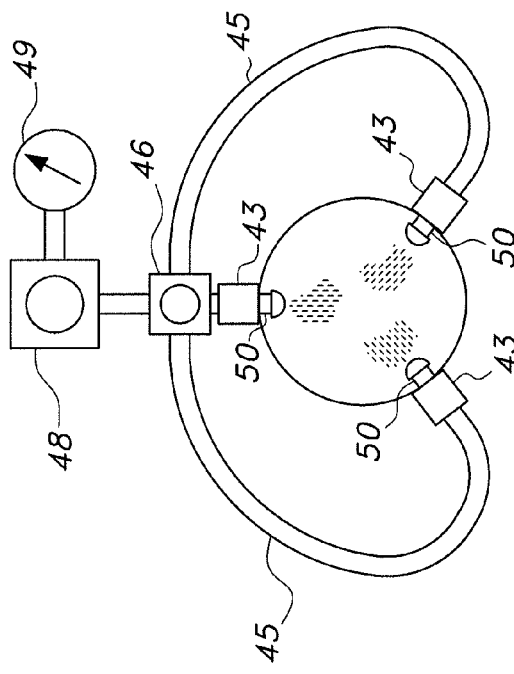
FIG. 18 shows a top perspective view of the same pipe of FIG. 7.
Figure 19:
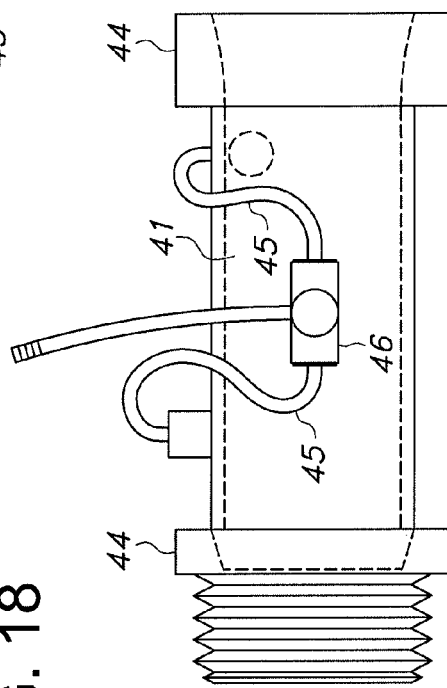
FIG. 19 shows a front cross-sectional view of the conveyance component pipe of FIG. 17.
Figure 17:
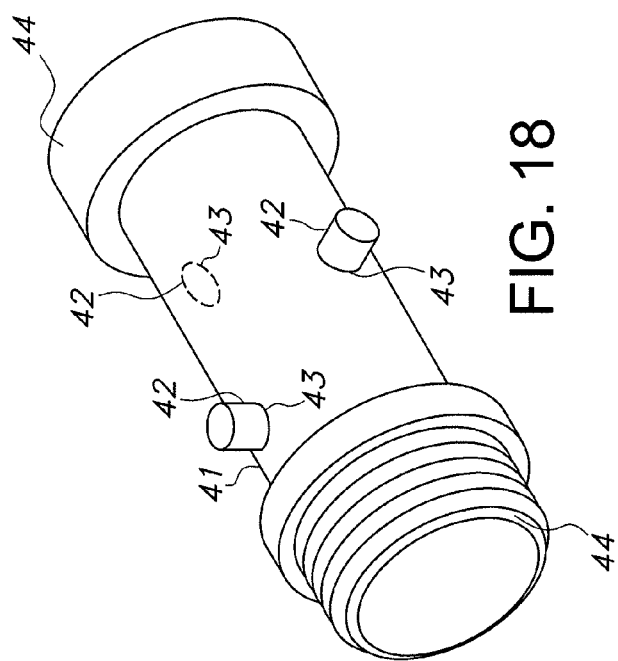
FIG. 17 provides a top view of a PVC pipe conveyance component of the present invention.
Figure 22:
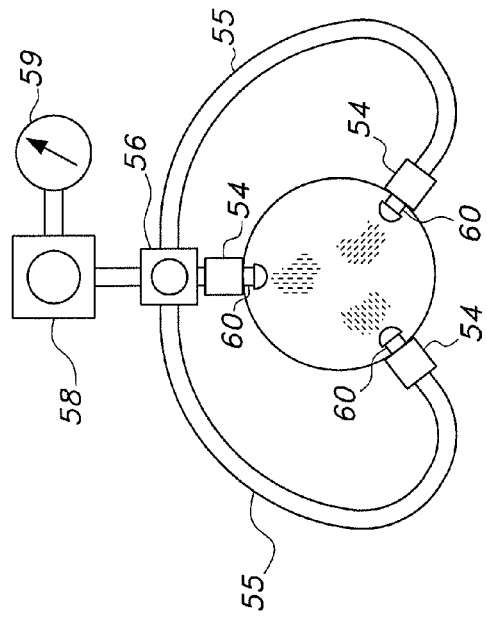
FIG. 22 shows a top perspective view of the same pipe of FIG. 20.
Figure 20:
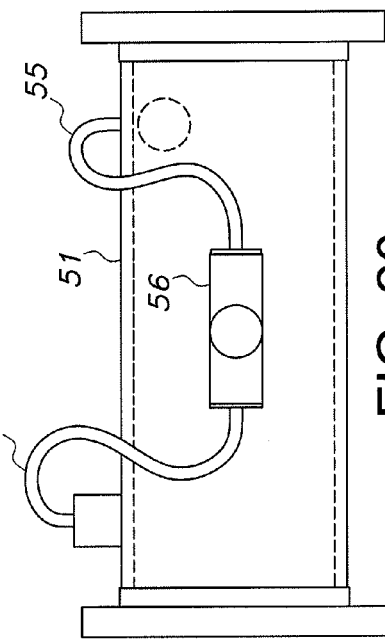
FIG. 20 provides a top view of an industrial air accelerator-type conveyance component of the present invention.
Figure 23:
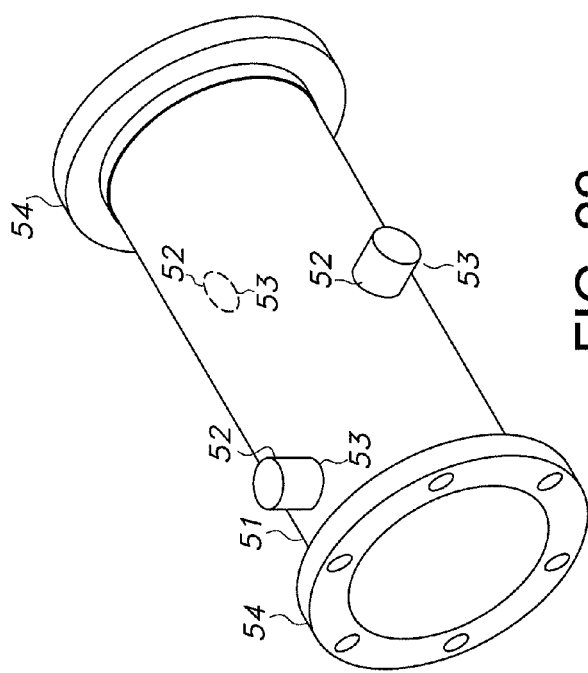
FIG. 23 shows a front cross-sectional view of the conveyance component pipe of FIG. 20.
Figure 21:
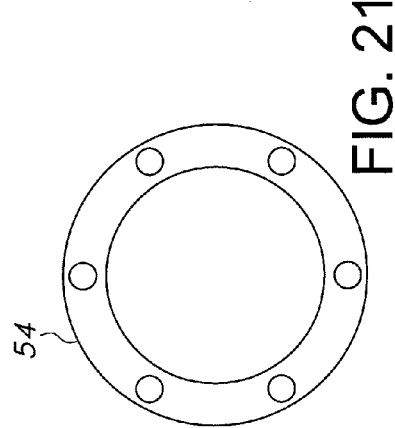
FIG. 21 shows a front view of the same pipe of FIG. 20.
Figure 30:
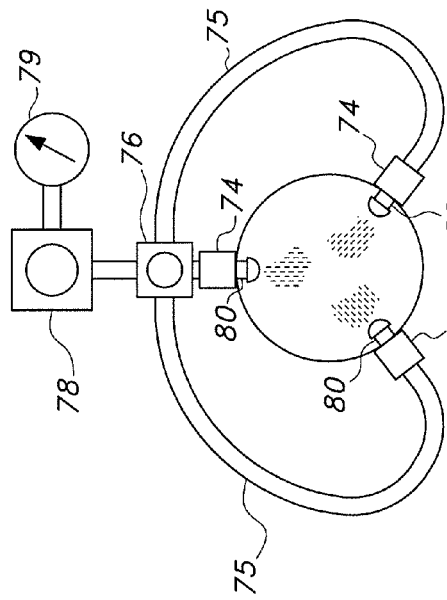
FIG. 30 shows a top perspective view of the same pipe of FIG. 28.
Figure 31:
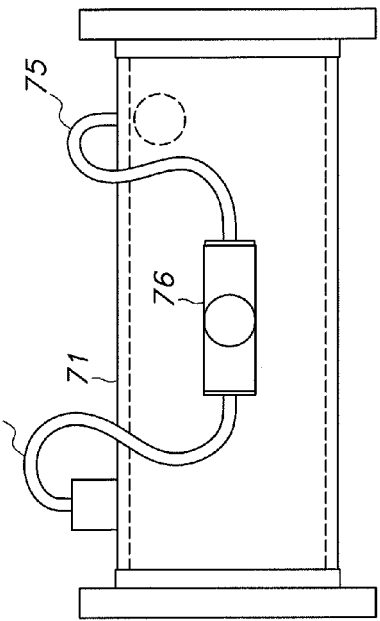
FIG. 31 shows a front cross-sectional view of the conveyance component pipe of FIG. 28.
Figure 28:
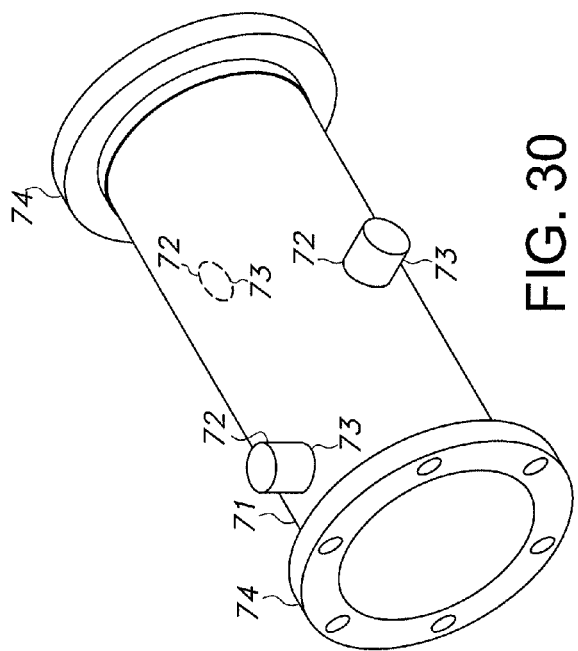
FIG. 28 provides a top view of a positive displacement industrial vacuum loader pipe conveyance component of the present invention.
Figure 29:
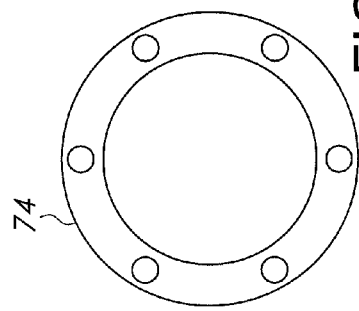
FIG. 29 shows a front view of the same pipe of FIG. 28.
Figure 43:
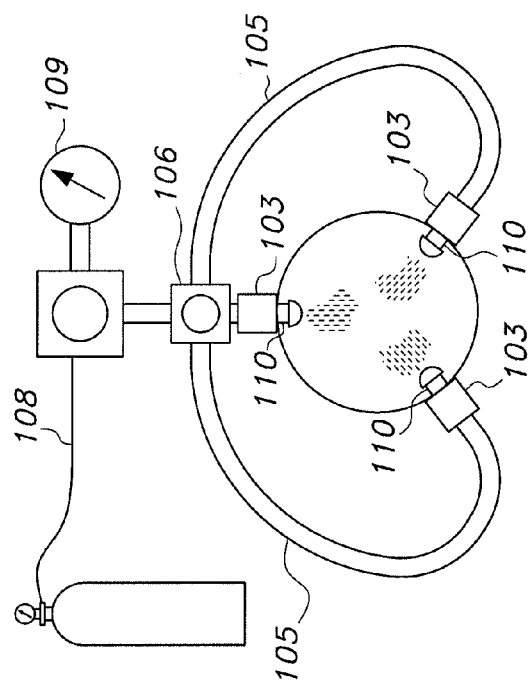
FIG. 43 shows a front cross-sectional view of the conveyance component pipe of FIG. 40.
Figure 40:
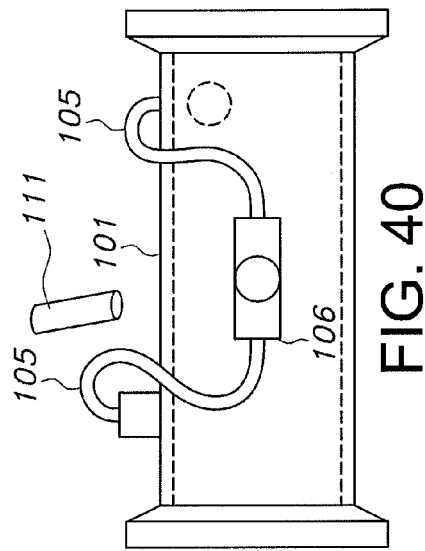
FIG. 40 provides a top view of a vacuum particle accelerator/collider pipe conveyance component of the present invention.
Figure 42:
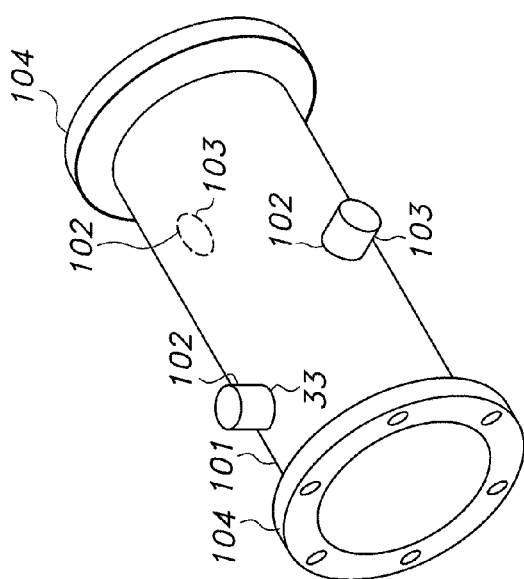
FIG. 42 shows a top perspective view of the same pipe of FIG. 40.
Figure 41:
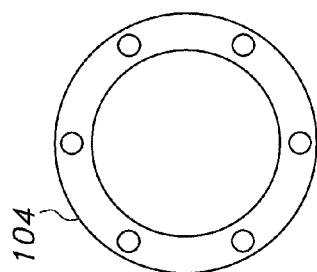
FIG. 41 shows a front view of the same pipe of FIG. 40.
Figure 47:
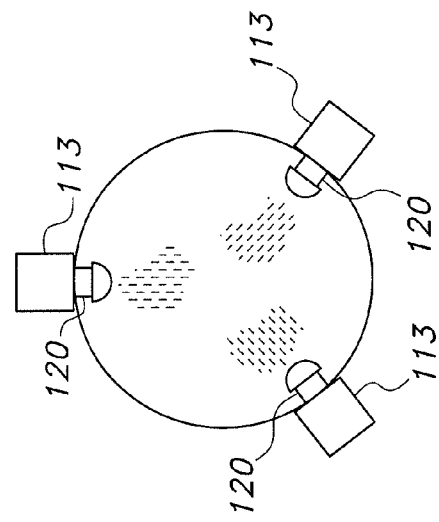
FIG. 47 shows a front cross-sectional view of the conveyance component pipe of FIG. 44.
Figure 44:
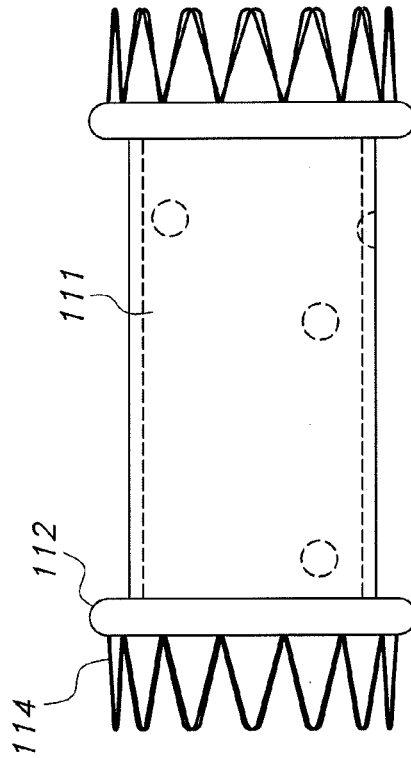
FIG. 44 provides a top view of a vacuum accelerator prosthetic heart valve pipe conveyance component of the present invention.
Figure 46:
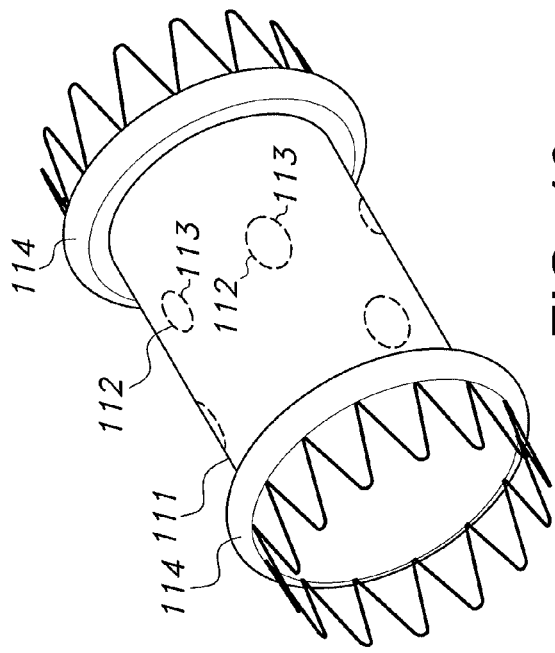
FIG. 46 shows a top perspective view of the same pipe of FIG. 44.
Figure 45:
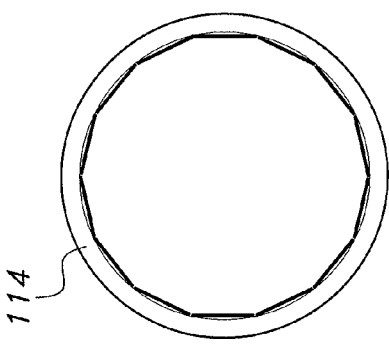
FIG. 45 shows a front view of the same pipe of FIG. 44.
Figure 51:
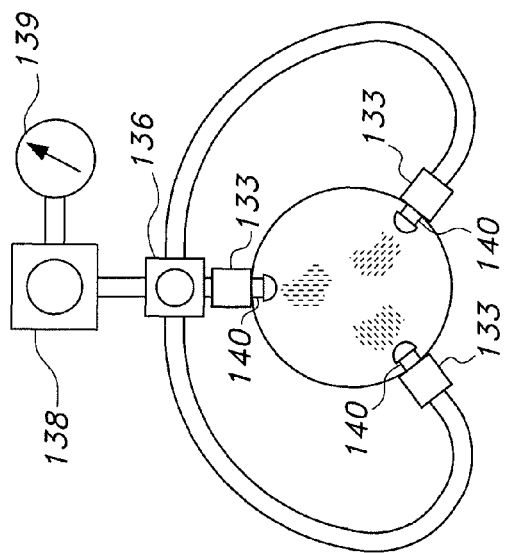
FIG. 51 shows a front cross-sectional view of the conveyance component pipe of FIG. 48.
Figure 48:
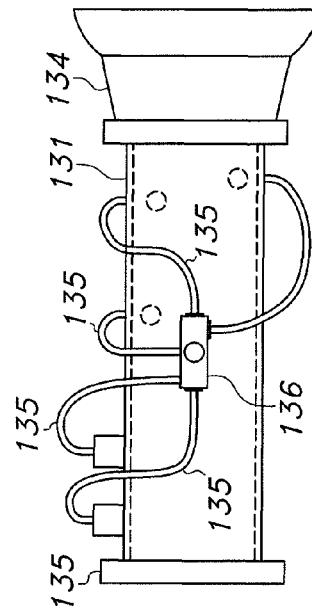
FIG. 48 provides a top view of a fuel injector add-on pipe conveyance component of the present invention.

A polyvinyl chloride application is shown in FIGS. 17-19 with a tubular PVC cylinder 41. Such a cylinder 41 is, as above, drilled for ports couplings 42 and are welded strategically to the outside cylinder wall. The orifice size of the port with or without nozzles can be varied as well as the angle of the port to increase or decrease the speed and efficiency of the vacuum accelerator 43. The air couplings are attached to the ports on the tubular cylinder 42. PVC flanges 44 are attached to the end of the tube 41 in various configurations, so that the vacuum accelerator can be attached to the vacuum or air conveyance columns. Air lines 45 are then attached to fittings, the air manifold 46 (4-way valve) to distribute air where needed and a separate airline for air inlet. The variable air valve 47 is then in place to control flow and pressure and is connected to the air supply 48. The pressure gauge 49 is then attached to monitor the overall unit. The nozzles 50 are then inserted within the couplers 42 to permit the injection of the gas (fluid) within the internal portion of the conveyance component of the unit.

An inventive industrial street sweeper-type regenerative air style machine air accelerator conveyance component is shown in FIGS. 20-23 with a tubular cylinder 51. Such a cylinder 51 is, as above, drilled for ports couplings 52 and are welded strategically to the outside cylinder wall. The orifice size of the port with or without nozzles can be varied as well as the angle of the port to increase or decrease the speed and efficiency of the vacuum accelerator 53. The air couplings are attached to the ports on the tubular cylinder 52. Flanges 54 are attached to the end of the tube 51 in various configurations, so that the vacuum accelerator can be attached to the vacuum or air conveyance columns. Air lines 55 are then attached to fittings, the air manifold 56 (4-way valve) to distribute air where needed and a separate airline for air inlet. The variable air valve 57 is then in place to control flow and pressure and is connected to the air supply 58. The pressure gauge 59 is then attached to monitor the overall unit. The nozzles 60 are then inserted within the couplers 52 to permit the injection of the gas (fluid) within the internal portion of the conveyance component of the unit.

An inventive high pressure vacuum accelerator for, for example, water transport, is shown in FIGS. 24-27 with a tubular cylinder 61. Such a cylinder 61 is, as above, drilled for ports couplings 62 and are welded strategically to the outside cylinder wall. The orifice size of the port with or without nozzles can be varied as well as the angle of the port to increase or decrease the speed and efficiency of the vacuum accelerator 63. The air couplings are attached to the ports on the tubular cylinder 62. Flanges 64 are attached to the end of the tube 61 in various configurations, so that the vacuum accelerator can be attached to the vacuum or air conveyance columns. Air lines 65 are then attached to fittings, the air manifold 66 (4-way valve) to distribute air where needed and a separate airline for air inlet. The variable air valve 67 is then in place to control flow and pressure and is connected to the air supply 68. The pressure gauge 69 is then attached to monitor the overall unit. The nozzles 70 are then inserted within the couplers 62 to permit the injection of the water (fluid) within the internal portion of the conveyance component of the unit.

An inventive industrial vacuum loader for positive displacement is shown in FIGS. 28-31 with a tubular cylinder 71. Such a cylinder 71 is, as above, drilled for ports couplings 72 and are welded strategically to the outside cylinder wall. The orifice size of the port with or without nozzles can be varied as well as the angle of the port to increase or decrease the speed and efficiency of the vacuum accelerator 73. The air couplings are attached to the ports on the tubular cylinder 72. Flanges 74 are attached to the end of the tube 71 in various configurations, so that the vacuum accelerator can be attached to the vacuum or air conveyance columns. Air lines 75 are then attached to fittings, the air manifold 76 (4-way valve) to distribute air where needed and a separate airline for air inlet. The variable air valve 77 is then in place to control flow and pressure and is connected to the air supply 78. The pressure gauge 79 is then attached to monitor the overall unit. The nozzles 80 are then inserted within the couplers 72 to permit the injection of the gas (fluid) within the internal portion of the conveyance component of the unit.

An inventive industrial street sweeper-type regenerative air style machine vacuum accelerator conveyance component is shown in FIGS. 32-35 with a tubular cylinder 81. Such a cylinder 81 is, as above, drilled for ports couplings 82 and are welded strategically to the outside cylinder wall. The orifice size of the port with or without nozzles can be varied as well as the angle of the port to increase or decrease the speed and efficiency of the vacuum accelerator 83. The air couplings are attached to the ports on the tubular cylinder 82. Flanges 84 are attached to the end of the tube 81 in various configurations, so that the vacuum accelerator can be attached to the vacuum or air conveyance columns. Air lines 85 are then attached to fittings, the air manifold 86 (4-way valve) to distribute air where needed and a separate airline for air inlet. The variable air valve 87 is then in place to control flow and pressure and is connected to the air supply 88. The pressure gauge 89 is then attached to monitor the overall unit. The nozzles 90 are then inserted within the couplers 82 to permit the injection of the gas (fluid) within the internal portion of the conveyance component of the unit.

An inventive long distance water transport conveyance component having a 72 inch diameter tubular cylinder 91 is shown in FIGS. 36-39. Such a cylinder 91 is, as above, drilled for ports couplings 92 and are welded strategically to the outside cylinder wall. The orifice size of the port with or without nozzles can be varied as well as the angle of the port to increase or decrease the speed and efficiency of the vacuum accelerator 93. The air couplings are attached to the ports on the tubular cylinder 92. Screw-type couplers (MPTH) 94 are attached to the end of the tube 91 in various configurations, so that the vacuum accelerator can be attached to the vacuum or air conveyance columns. Air lines 95 are then attached to fittings, the air manifold 96 (4-way valve) to distribute air where needed and a separate airline for air inlet. The variable air valve 97 is then in place to control flow and pressure and is connected to the air supply 98. The pressure gauge 99 is then attached to monitor the overall unit. The nozzles 100 are then inserted within the couplers 92 to permit the injection of the gas (fluid) within the internal portion of the conveyance component of the unit.

An inventive particle accelerator (for a particle collider, for example) is shown in FIGS. 40-43 with a miniature tubular cylinder 101 and a pulse electro-magnet 101A. Such a cylinder 101 is, as above, drilled for ports couplings 102 and are welded strategically to the outside cylinder wall. The orifice size of the port with or without nozzles can be varied as well as the angle of the port to increase or decrease the speed and efficiency of the vacuum accelerator 103. The air couplings are attached to the ports on the tubular cylinder 102. Flanges 104 are attached to the end of the tube 101 in various configurations, so that the vacuum accelerator can be attached to the vacuum or air conveyance columns. Air lines 105 are then attached to fittings, the air manifold 106 (4-way valve) to distribute air where needed and a separate airline for air inlet. The variable air valve 107 is then in place to control flow and pressure and is connected to the air supply 108. The pressure gauge 109 is then attached to monitor the overall unit. The nozzles 120 are then inserted within the couplers 102 to permit the injection of the gas (fluid) within the internal portion of the conveyance component of the unit.

An inventive prosthetic heart valve (asymmetrical or symmetrical) vacuum accelerator conveyance component is shown in FIGS. 44-47 with a very small tubular cylinder 111. Such a cylinder 111 is, as above, drilled for ports couplings 112 and are welded strategically to the outside cylinder wall. The orifice size of the port be varied as well as the angle of the port to increase or decrease the speed and efficiency of the vacuum accelerator 113. Blood is forced through the couplings 113 and nozzles 112 to effectuate the vortex effect within the tube 111. The air couplings 113 are attached to the ports 112 on the tubular cylinder 111. Suture ring flanges 114 are attached to the end of the tube 111 in various configurations, so that the vacuum accelerator can be attached to the vacuum or air conveyance columns in order to act in combination with a valve structure as needed.

An inventive fuel injector with an added conveyance component is shown in FIGS. 48-52 with a tubular cylinder 131. Such a cylinder 131 is, as above, drilled for ports couplings 132 and are welded strategically to the outside cylinder wall. The orifice size of the port with or without nozzles can be varied as well as the angle of the port to increase or decrease the speed and efficiency of the vacuum accelerator 133. The air couplings are attached to the ports on the tubular cylinder 131. Flanges 134 are attached to the end of the tube 131 in various configurations, so that the vacuum accelerator can be attached to the vacuum or air conveyance columns. Air lines 135 are then attached to fittings, the air manifold 136 (4-way valve) to distribute air where needed and a separate airline for air inlet. The variable air valve 137 is then in place to control flow and pressure and is connected to the air supply 138. The pressure gauge 139 is then attached to monitor the overall unit. The nozzles 140 are then inserted within the couplers 52 to permit the injection of the gas (fluid) within the internal portion of the conveyance component of the unit. The unit is introduced within a fuel injector 145, including a pressurized fuel line 154, fuel filter 155, an electrical boost attachment 153, a solenoid 152, a plunger 157, a valve spring 151, and a spray tip 150, all housed within a casing 156. When the fuel injector 145 is operated, the fuel pressure can be increased by the conveyance component as described above. Additionally, the source of the injector supply may be excess fuel that allows for recoupment and less waste thereof for extra economic benefits and efficiencies.

In terms, then, of the actual operation of the invention, for all structures, basically, with a few notable exceptions, the tubular cylinder is to contain the material being conveyed or vacuumed. The ports with or without orifices are to convey air angularly against the inside sidewall of the cylinder to create negative pressure that creates a vortex effect inside the cylinder. Calibrate and attach air coupling to cylinder. The size, angle, and number of couplings depend on the vacuum acceleration required for the application. For example, a three-inch diameter tube vacuum accelerator might require fewer ports than a four foot diameter vacuum accelerator. The angle of the port to the cylinder wall will affect the speed and negative pressure desired for the application. The flanges are installed to the tube so that it can attach to various vacuum columns inline. Air lines are attached to the fittings and run to air manifolds for air distribution where needed. A variable air valve is installed to regulate air flow and pressure and gauge is installed to regulate pressure. The unit will convey liquids and material even when not attached to vacuum column. The pressure gauge monitors the unit. The nozzles inserted into the couplers create directional pressure which increases velocity on the cylinder wall. The unit is also directional and configured to create vacuum acceleration when installed in the conveyance direction to direct material towards the vacuum in order to create negative pressure, and to create vacuum deceleration when installed in reverse.

The overall components of the device may be of different materials themselves. In terms of, for instance, the tubular cylinder, such may be varied in size from just a few millimeters to 8 foot in diameter. As well, then, the tube may be constructed of a variety of materials such as; steel, abrasion-resistant steel, exten steel, corten steel, polyvinyl chloride, plastic resin, urethane, all forms of stainless steel, all forms of precious metals, copper, bronze, or even glass. The material chosen for the tube depends on the type of material one wants to convey. Flanges are next added to the cylinder shaped tube. These flanges are normally constructed of the same material as the tube. Flanges can be band lock, flat flange, seamless, weld-able, or clamp together flanges of any nature. Basically, flange selection depends on the vacuum column to attachment is to be made. If the vacuum column uses flat flanges then such should be utilized as well in conjunction with the cylinder. If the tube is made of metal, flanges may also be welded to the tubular cylinder. The flanges just serve the purpose of attaching the unit in-line to the vacuum column and or air conveyance column. Drilling, plasma cutting, torch utilization, etc., may be undertaken, as examples, to make appropriate holes in the tubular cylinder. The diameter of the holes, the size of the holes, and the number of holes depends on the speed of vacuum accelerator one desires. Couplings are then attached over the holes drilled in the tube. It is easier to attach the pressure nozzles into one end of the coupling and then attach the couplings to the tubular cylinder, generally, though not necessarily. If, for example, the tubular cylinder is metal, then the couplings can be welded, for example, at the correct angle with the nozzle facing the inside wall of the cylinder. If the tubular cylinder is PVC material, the same process may be followed, but the couplings are preferably cemented, for example, to the cylinder. The air couplings are then attached to the other end of the couplings that are welded to the tubular cylinder. The airlines are then attached to the air couplings and then to the air manifold. The variable air valve is attached to the manifold and a pressure gauge can then be added to monitor unit. The air supply is connected to the manifold inlet and all is ready to be utilized with the airlines intact within the nozzles.

The size and type of material for the pressure nozzles can be varied to change the acceleration ratios. Some examples are ceramic nozzles versus carbide nozzles, or abrasion resistant steel nozzles depending on the material to be conveyed. The diameter and shape of the nozzle orifices can be altered to change the performance. The orifice size could be a couple of millimeters or less or several feet in diameter, depending on the size of vacuum accelerator needed. Nozzles may be made from a variety of materials and may be constructed from materials such as straight drilled pipe to very sophisticated tips with elongated holes, broad examples. The amount of air supplied to the unit can be varied from 1 cfm to hundreds of thousands of cfm. The size of the vacuum accelerator will depend on what vacuum or air conveyance column or structure one wants to attach the unit to. The type of air manifold can be varied depending on the application. Even the size, angle, material of ports can vary.

To use this invention, one would attach the unit to the vacuum or air conveyance column, the liquid supply, or a blood supply, as needed; the supply is initiated and effectively begins the generation of the desired vortex effect, whether in terms of vacuum or air conveyance, whether positive or negative pressures (dependent on the direction of accelerator or decelerator in place). This invention could be used on street sweepers, environmental and industrial vacuum loaders, septic vacuum trucks and any vacuum or air conveyance system. This invention would increase productivity of these units at a lower cost. There are many industrial plant applications that need to convey material more efficiently at reduced costs. Industrial plants have miles of pipe that they utilize to move materials around their plants. Many of these plants use positive displacement blowers and or large air conveyance systems. The inventive vacuum accelerator can be attached to the pipe lines to reduce the frictional drag of the columns and to speed the conveyance of materials throughout the plant. This inventive device could also be utilized gas and oil pipelines to more efficiently convey materials longer distances at greater speed.

Other variables that would help change dynamic pressure of the vacuum column are as follows:
1. The number of orifices and the location they are placed on a vacuum column.
2. The size, shape and material the port orifices are made out of.
3. If one were to add any type of lubricator to the system to reduce the frictional force.
4. The diameter of the airlines, and the type of material they are made out of. Some examples are copper, steel, nylon, plastic and alloys. Thermo plastics and many heat resistant materials as well.
5. The amount of air pressure supplied to the system. This is usually expressed in cfms.
6. The actual air routing to the air supply, the manifold, and the size and type of manifold can all effect the change in dynamic pressure.
7. Another variable that can be added to my invention to further increase the power of my vortex effect is the addition of a small electro-magnetic field to intensify the vortex effect.
8. The shape of the tubular cylinder can be altered to effect dynamic pressure. For example, the shape of the tubular cylinder can be hexagonal rather than cylindrical or any irregular shape to affect the energy level from the vortex effect; this will in turn change the dynamic pressure of the vacuum column, and/or the air conveyance column velocity in turn.
9. Another important note is that the vortex effect does not have to be perfectly symmetric to work.
10. The invention device change the densities and viscosity of substances in the vacuum column and/or air conveyance column. The energy created by the vortex will aid in the mixing of compounds being introduced to the human body. It will aid in the dynamic pressure and or air velocity necessary to create the appropriate mixture of compounds, liquids and or gases to achieve the desired result.

Furthermore, in the bonding of substances on a molecular level, and or on an electron, proton and neutron basis, that energy, magnetism and pressure all affect the bonding of elements into compound substances. Thereby, the tremendous energy naturally found in a vortex, induced on to substances passed through my invention will aid medical science in the more efficient bonding and blending of substances and possibly the creation of new substances. As the vortex effect creates its own electro-magnetic field.

This device can also change the temperature, thereby altering the characteristics and consistency of substances that passes through my invention. In other words it will change the form of the matter that passes through the vortex effect. Depending on the direction the initial substance is passed through my invention, some substances will change molecularly due to the effects of magnetism on an elemental level. Substances will end up more negatively or positively charged even on a P orbital basis.

In a science application, this device could also be used to aid research in electron and neutron acceleration, and potentially aid scientists in the creation of new substances and elements.

$$F=ma$$

Force=mass(acceleration)

$$F=qE$$

Therefore, this inventive device can help scientists change the acceleration or deceleration of electrons. The magnetic field created when an electron, proton or neutron, of an atom can be changed after passing through this vortex effect. Therefore, even a radioactive isotope could be altered from this vortex effect.

In an electron application, this could be constructed on a smaller scale to a vacuum chamber and a free electron would be accelerated with a laser and a gas (most likely xenon) can be pressurized and sent through a heat resistant alloy gas manifold to the nozzle ports. Such that, the free electron passes through the tubular cylinder, with a laser (thermal energy) providing the dynamic pressure for the cylinder. Now as the electron passes through my invention it would gain velocity from a thermal vortex effect and would simulate fusion as an energy source.

The electron would gain enormous speed as it passed through the thermal vortex effect cylinder. For this application the tubular cylinder would have to be made of a super heat resistant alloy and incorporate a low level electromagnetic field to further impact the acceleration through the vortex effect.

Pressurized air was utilized to create this vortex effect, however, any pressurized gas, liquid or solid could be substituted to create a change in the dynamic pressure of the vacuum column. For example, pressurized hydraulic fluid, food grade cooking oil, or even some of the product being transported could also be utilized to create a vortex effect on the vacuum column. Another example would be to use pressurized water in lieu of compressed air to create a vortex effect.

The number of holes can be varied depending on the acceleration rate desired. Another variable is the size of the orifice or hole that will change the acceleration rate as well as the number of holes in the tube that pressurized air is being introduced to. In my model, I utilized ½ inch diameter holes with half inch airline and utilizes a variable air flow valve to control the flow of air and the orifice size and the deflection angle of the pressurized air hitting the inside sidewall of the cylinder and or tube controls the air and material speed of the accelerator and the inlet air pressure can all be adjusted to increase or decrease the speed of the materials through the pipe. Inlet air pressures and volumes of air can be adjusted to infinitely vary speed and achieve the desired reduction in friction and effective gravity on the material conveyed or being vacuumed i.e. Example negative pressure. The pressurized air when introduced to our cylinder creates a vortex effect inside the cylinder pipe that pulls material from one side of the cylinder and spins it out the opposite side with force. This effect works if the pipe is in a vertical, horizontal or any plane in between.

When negative pressure is introduced to the push side of the vacuum accelerator something totally fascinating occurs. The frictional drag of material whether it is water, sludge, or aggregate or any mixture thereof in between on the cylinder is decreased and the effective weight of material in the material is decreased. Therefore, this translates into the material in the vacuum column to move at a faster rate with the vacuum system be it positive displacement blower or vein pump or any vacuum system drive. The vacuum accelerator accelerates the material speed and aids moving any type of material in a pipe or tubular application.

The vacuum accelerator reduces the energy required to move material. The energy savings can be substantial. In a blower application the use of a vacuum accelerator can provide many benefits, for example: a vacuum accelerator can aid in moving material a longer distance than a blower system is currently capable of moving. In one test, we were able to convey material eight hundred feet through an eight inch pipe by clamping two vacuum accelerators in line on a horizontal pull. Another great benefit of a vacuum accelerator is increasing the speed of loading material through a pipe. Still another benefit is the increase in negative pressure or vacuum with all other item constant which will translate in significant energy costs reductions and fuel savings for combustible fuel engines or electrical energy savings through reduced horsepower requirements. When a blower, vein or vacuum system is attached to a vacuum accelerator, the system shall require less energy to perform the same amount of work. Therefore, saving can also be realized by utilizing smaller engines and motors to preform vacuum work. Saving can be realized by the consumption of less fuel and energy by allowing the vacuum system to perform at less RPM revolutions per minute, saving component life on the systems as well. The Vacuum Accelerator, shall be a very cost efficient unit. When a negative pressure vacuum system is applied to a vacuum accelerator the multiple reductions in energy is achieved by reducing the energy required on the vacuum system to preform work.

Also when a vacuum accelerator is applied to a centrifugal or centrifical compressor or any air conveyance system a vacuum accelerator works in the same accord, just at a different ratio. In an air conveyance system a vacuum accelerator aids in the reduction of frictional drag and reducing the natural force of gravity on the material being conveyed. This in turn, reduces the amount of energy required to move material through any pipe or cylindrical application to convey material.

In this case the vacuum accelerator is placed into line with the air conveyance column; the vacuum accelerator shall help the air conveyance system move material faster and with less energy than an air conveyance system without a vacuum accelerator. In this instance our unit actually becomes an air conveyance accelerator.

The inverse is also true that if you turn the unit around and swap ends the unit becomes an air conveyance decelerator or a vacuum system decelerator by simply putting the opposite end of the pipe to the existing system. Therefore, this unit will also work to slow the material speed down if that is the effect desired.

Another field tested benefit of a vacuum accelerator is to reduce the time required to perform a vacuum job or to reduce the time to perform an air conveyance job of material or liquids.

Typical applications shall be in vacuum of materials such as sewer, storm line and sludge debris and hazard materials vacuum systems that move aggregates and sludge. Street sweeper vacuum, air conveyance and regenerative air conveyance systems to reduce horsepower demands and fuel consumption, are examples. The Vacuum accelerators can be used to move more material at a faster rate into a debris body on a street sweeper or environmental conveyance vehicle.

Another application is to use vacuum accelerators in industrial plants to move liquids and solids, in plant lines to reduce energy costs and to speed the vacuum column of material from one point to another are it in a horizontal, vertical plane or any combination in between.

Another application is to use a vacuum accelerator in a lift station application to aid a lift station pump to move material in a force main and to move material into and from a treatment plant and or water or canal distribution plant. The power to move material into and from treatment plants is costly, many times employing high voltage (4160 volt) large motor driven electric generators that drive very large positive displacement blowers. A vacuum accelerator in line would decrease the energy required (start-up torque) and the energy required to maintain (running torque) of large blower systems. These units might be 36 inch to 72 inch in diameter depending on the system. The principle would be the same to reduce the amount of energy required to move liquids and aggregates through a column.

Another application would be in fuel injection systems for automobiles. As we know electronic fuel injector systems electronically sense when to open and close to create base pulse width based on load and rpm. A vacuum accelerator would allow less fuel to be required for combustion as through the vortex effect a larger percentage of the liquid gas would be converted to a gaseous state, thereby decrease the pulse width required for an equivalent amount of combustion. Also the velocity created would enhance combustion as well. These vacuum accelerators could be very small in size for example an eighth of an inch in diameter or smaller and installed in line into each injector system to decrease the amount of fuel required for combustion. A portion of the exhaust gas could be recycled and used as the air power source to create the vortex effect, there-by, reducing emissions while improving fuel economy simultaneously.

In diesel engine applications a vacuum accelerator could be used in a direct injection system to move evenly circulate the diesel mist inside a cylinder to achieve improved combustion with a decreased amount of fuel. As the vortex effect would allow more efficient mixing and a larger percentage of gaseous diesels as opposed to liquid diesel thereby aiding combustion with decreased amounts of actual fuel. Exhaust air can be the supply force or a mixture of exhaust and intake air, by recycling the exhaust air stream two advantages are gained, the heated air stream aids combustibility and reduces emissions while aiding fuel efficiency.

Another application relates to CNG gas transfer. One problem exists in the field of high pressure gas transfer. Currently, the methods are fast fill at around 3600 psi or up to 4300 psi and higher and slow fill at 3000 psi. Either method has its advantages and disadvantages in fill efficiency. Fast fill is approximately equal in the time required to liquid fill a tank and slow fill takes several hours, but fills the tanks to a greater volume. My invention shall reduce the time to fill the receiving tank in either situation. The other benefit is that the tanks shall fill with greater volume. The filling line is connected to one end of the vacuum accelerator via a high pressure gas fitting. The opposite end is attached to the receiving tank. The supply hose for the vacuum accelerator is this case is attached to a lower pressure CNG fill tank. As the lower pressure gas enters the accelerator this causes a low pressure area at the receiving tank inlet, increasing the differential pressure, which in turn causes the tank to fill more rapidly. An external cooler can be applied to the accelerator that actually lowers the temperature of the CNG gas and thus causes the receiving tank to fill to greater volume capacity as it decreases the expansion rate of the gas. The end result is that the receiving tanks are filled more efficiently.

Another application relates to increasing propulsion efficiency by decreasing residual kinetic energy via a vacuum accelerator attached to air breathing jet engine.

$$N, (\text{Overall energy efficiency}) = Np(\text{Propulsion Efficiency}) \times Nve(\text{Cycle Efficiency})$$

Therefore; for jet engines the propulsive efficiency is highest when the jet engine emits an exhaust jet at a velocity that is the same as, or nearly the same as, the vehicle speed as this gives the smallest residual kinetic energy. The formula for air breathing engines moving at speed v with an exhaust velocity Ve is given:

$$Np(\text{Propulsion Efficiency}) = \frac{2}{1 + Ve/v}$$

The invention shall be attached to the end of the jet nozzle and the unit shall increase propulsion efficiency by lowering the residual kinetic energy. The vacuum decelerator shall slow the exhaust velocity thru its vortex effect when propulsion is required and the vacuum shall accelerate when the exhaust velocity needs to increase to reduce propulsion rapidly. The invention not only improves propulsion efficiency, it also is an excellent safety device that allows the pilot to vary his deceleration without causing stall.

In addition, normal air fuel ratios of 50:1 rich to 130:1 weak limit vary depending on take-off, cruise and altitude, but because the invention reduces residual kinetic energy as exhaust velocity jet approaches velocity, significant fuel saving are achieved, and overall propulsion efficiency is optimized.

My invention was also applied to an air conveyance system, and my invention changes the air velocity of an air conveyance column as well.

In an electron application my invention would be constructed on a smaller scale to a vacuum chamber and a free electron would be accelerated with a laser and a gas most likely xenon can be pressurized and sent through a heat resistant alloy gas manifold to the nozzle ports, such that the free electron passes through the tubular cylinder, with a laser (thermal energy) providing the dynamic pressure for the cylinder. Now as the electron passes through my invention it would gain velocity from a thermal vortex effect and would simulate fusion as an energy source.

Although specific applications and or embodiments of the invention have been described with reference to the drawing are by way of examples only and merely illustrate some of the many possible specific applications embodiments which represent application of the principles of the invention. Various changes, manipulations and/or obvious modifications to one skilled in the art to which the invention pertains are deemed to be within the scope, the spirit, essence, and contemplation of the invention as further defined within the following claims.

The invention claimed is:

1. A materials transport device including a cylinder, pipe, and/or tube conveyance component having an external portion and an internal portion, both measuring the same length and sharing the same first end and same opposing second end, wherein said conveyance component comprises at least three injectors substantially evenly spaced circumferentially around said external portion and substantially evenly spaced at differing locations along said length of said external portion, said at least three injectors and housed around the circumference of the external portion thereof providing internal introduction of forced fluids angularly within the internal portion of said conveyance component, wherein said injectors are aligned to provide uniform angles of fluid introduction within said conveyance component internal portion, and wherein said uniform angles of fluid introduction create a vortex effect within said conveyance component upon uniform introduction of fluid or gas materials within said injectors such that said vortex effect creates vacuum acceleration in one direction and vacuum deceleration in the reverse direction.

2. The materials transport device of claim 1 further including a fluid source component that is connected separately to each injector, thereby introducing the same pressure and velocity fluid within the conveyance component internal portion during operation.

3. The transport device of claim 1 provided in the form of a solids transport structure, a liquid transport structure, or a gas transport structure.

4. The transport device of claim 2 provided in the form of a solids transport structure, a liquid transport structure, or a gas transport structure.

5. The transport device of claim 1 provided in the form of a valve-like structure, a vacuum-assisted structure, or an air or liquid conveyance structure.

6. The transport device of claim 1 provided in the form of a valve-like structure, a vacuum-assisted structure, or an air or liquid conveyance structure.

* * * * *